Figure 1:
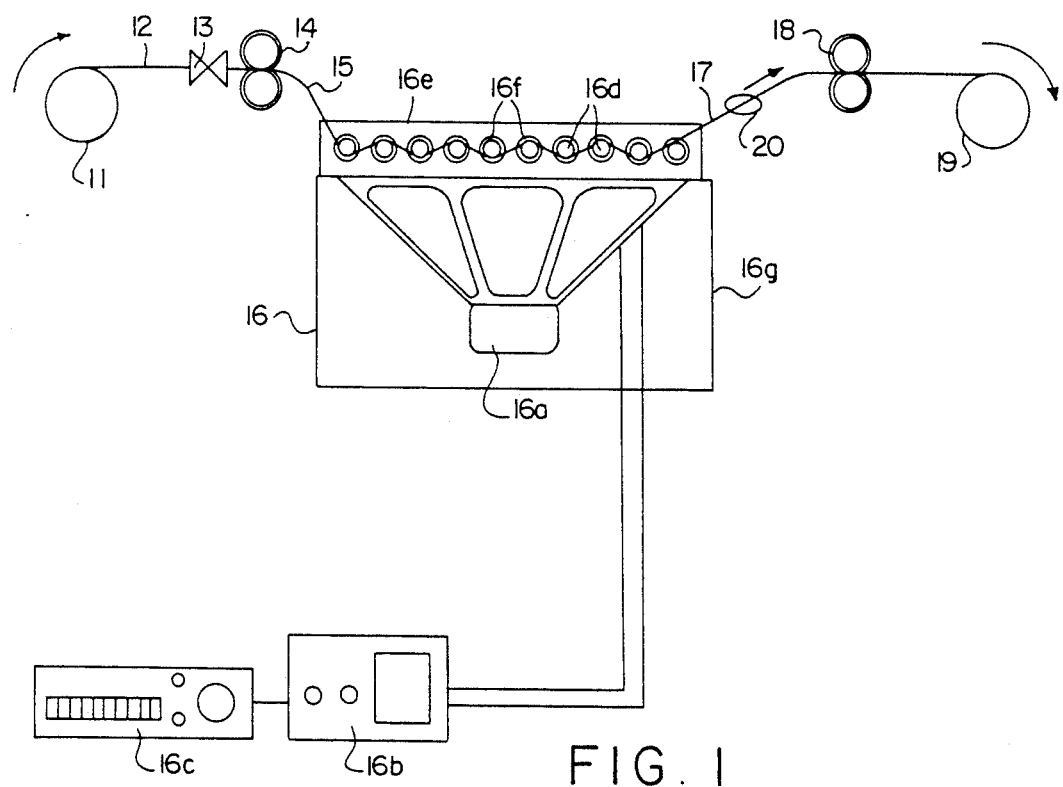

United States Patent [19]
Iyer et al.

[11] Patent Number: 5,042,122
[45] Date of Patent: Aug. 27, 1991

[54] METHOD AND SYSTEM FOR SPREADING A TOW OF FIBERS

[75] Inventors: Shridhar Iyer, East Lansing; Lawrence T. Drzal, Okemos, both of Mich.

[73] Assignee: Board of Trustees operating Michigan State University, East Lansing, Mich.

[21] Appl. No.: 553,642

[22] Filed: Jul. 18, 1990

Related U.S. Application Data

[63] Continuation-in-part of Ser. No. 484,779, Feb. 26, 1990.

[51] Int. Cl.$^5$ .......................................... D01D 11/02
[52] U.S. Cl. ...................................... 28/283; 28/220; 28/282; 19/65 T; 19/0.46; 427/185; 427/57
[58] Field of Search ............... 19/65 T, 0.35, 0.37, 19/0.56, 0.60; 427/185, 57; 28/220, 282, 283

[56] References Cited

U.S. PATENT DOCUMENTS

| | | | |
|---|---|---|---|
| 2,244,203 | 6/1941 | Kern | 19/65 |
| 3,704,485 | 5/1972 | Hall | 19/65 T |
| 3,742,106 | 6/1973 | Price | 264/134 |

*Primary Examiner*—Shrive Beck
*Assistant Examiner*—Benjamin L. Utech
*Attorney, Agent, or Firm*—Ian C. McLeod

[57] ABSTRACT

A method and system for spreading a tow of fibers (12) using the acoustic energy from a speaker (16a) or other vibrating device for a gaseous medium over which the tow passes as the fibers zig-zag between rods (16d) is described. The spread two of fibers are produced at high speed with uniform spacing and are used to make composites with plastics.

7 Claims, 2 Drawing Sheets

METHOD AND SYSTEM FOR SPREADING A TOW OF FIBERS

CROSS-REFERENCE TO RELATED APPLICATION

The present invention is a continuation-in-part of U.S. patent application Ser. No. 484,779, filed Feb. 26, 1990 and still pending.

BACKGROUND OF THE INVENTION (1) Field of the Invention

The present invention relates to a method and system for spreading a tow of fibers using energy from a gas vibrating means adjacent to the fibers. In particular, the present invention relates to a method and system where the tow of fibers zig-zag over spaced apart rods adjacent to the diaphragm of a speaker while maintaining a slack in the tow to allow spreading of the tow of fibers by movement of the gas above the speaker and around the tow of fibers.

(2) Prior Art

U.S. Pat. No. 3,704,485 to Hall describes a method and apparatus for spreading a tow of fibers using a speaker or other gas vibrating means adjacent to the fibers. The tow of fibers passes over the speaker under low tension, essentially by tension created by the weight of the fibers, and is spread by the sound waves in the gaseous medium, usually air, created by the speaker. The Hall method works well; however, the tow of fibers are unrestrained while being acted upon by the sound waves and can be easily damaged. Also, there is no means described by Hall for maintaining the spread of the fibers over the speaker so that the maximum spread is achieved. Also Hall uses internally wound spools for feeding the tow of fibers which provide little or no tension on the fibers of the tow.

OBJECTS

It is therefore an object of the present invention to provide a method and system for spreading a tow of fibers wherein the fibers are maintained in a spread condition without damage to the fibers. Further, it is an object of the present invention to provide a method and system which is very effective in spreading the fibers to any width in a controllable manner. Further still, it is an object to provide a method which is fast, simple, economical, reliable and reproducible. These and other objects will become increasingly apparent by reference to the following description and the drawings.

IN THE DRAWINGS

FIG. 1 is a front schematic view of the system of the present invention particularly illustrating the zig-zag of the spreading tow of fibers over rods 16d wound above the diaphragm of a speaker 16a.

Figure 2:
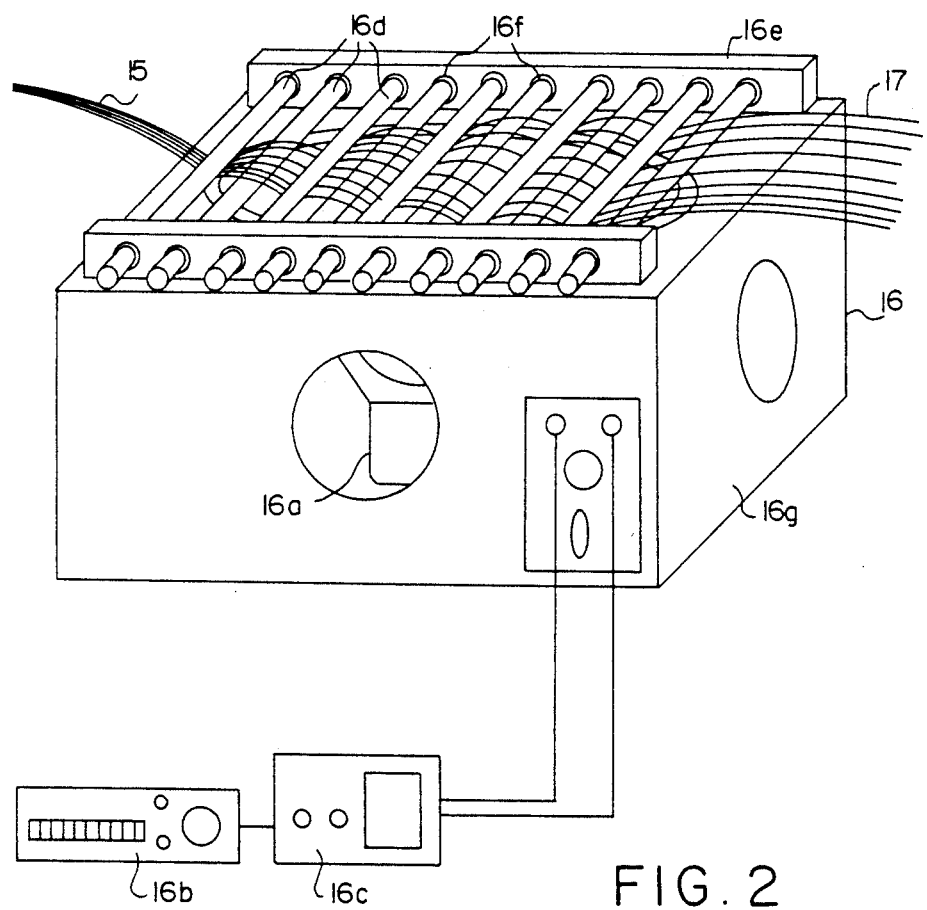

FIG. 2 is a front perspective view of the cabinet and speaker 16a showing the rods 16d mounted on a holder 16e.

GENERAL DESCRIPTION

The present invention relates to a system for spreading fibers in a tow of the fiber which comprises: feed means for feeding the tow of the fibers; spreader means for spreading the tow of the fibers from the feed means including a vibrating means for a gaseous medium mounted in a housing adjacent to the tow of the fibers and multiple rod means mounted adjacent to the vibrating means and spaced apart in the direction of movement of the tow of the fibers such that the tow of the fibers zig-zag over and under the rod means so that the fibers in the tow spread apart as the tow moves between the rod means; and take-up means for the spread apart fibers in the tow after the tow has moved through the spreader means.

The present invention also relates to a method for spreading fibers of a tow of fibers which comprises: providing a system for spreading fibers in a tow of the fibers which comprises: feed means for feeding the tow of the fibers; spreader means for spreading the tow of the fibers from the feed means including a vibrating means for a gaseous medium mounted in a housing adjacent to the tow of the fibers to spread the fibers and multiple rod means mounted adjacent to the vibrating means and spaced apart in the direction of movement of the tow of the fibers such that the tow of the fibers zig-zag over and under the rod means so that the fibers in the tow spread apart as the tow moves between the rod means; and take-up means for the spread apart fibers in the tow after the tow has moved through the spreader means; feeding the tow of the fibers through the spreader and between the feed means and the take-up means to provide the spread apart fibers in the tow on the take-up means.

The spreader system operates on the principle that a pulsating flow of energy in a gaseous medium spreads a collimated fiber tow into its individual filaments. The source of this energy is a vibrating cone or diaphragm of a speaker or other vibrating means which oscillates at a predetermined frequency and amplitude. An acoustic horn or vibrating diaphragm can also be used to produce the vibrations in the gaseous medium. The acoustic energy provided by the speaker enables the fiber tow to spread to any desired width. For a particular fiber tow, there is a narrow range of frequencies at which the efficiency of spreading is the maximum. The spreading width is a function of tow tension in the region over the spreader and the amplitude of the sound wave once the right frequency is selected. The spreading width increases with increasing amplitude (frequency and tension constant) to a plateau beyond which there is no appreciable increase. The spreading width increases with decreasing tension to a point beyond which there is too much slack which causes uncontrollable fiber motion and oscillations resulting in fiber damage.

The acoustic speaker operates in air or in any suitable gas whether reactive (e.g. oxygen) or non-reactive (nitrogen) in an enclosed space around the speaker.

The acoustic speaker preferably has a rating of about 8 ohms and 100 watts and a sound level of about 80 to 130 dB. The frequency is between about 32 and 39 Hz. Essentially any frequency can be used, preferably in the audio to ultrasonic range. Usually the range is between about 1 and 20,000 Hz.

The fibers can be of any diameter. Preferably fibers have a diameter of between about 1 and 250 microns. The tow preferably contains between about 30 and 250,000 individual fibers. The fibers can be plastic, ceramic or metallic.

The rods have a curved surface over which the spreading fibers pass. The rods preferably are circular in cross-section. The rods can be fixed in position; however, it is preferred that they rotate when they are circular in cross-section to avoid damage to the fibers.

The fibers are passed in low tension over the speaker. This is most easily accomplished by providing nip rollers or other restraining means on either side of the spreader or controlled tension between the take-up spool and the feed spool.

The spread fibers can be impregnated with a resin. The method of U.S. application Ser. No. 484,779 is preferred.

SPECIFIC DESCRIPTION

A schematic of the preferred spreading system is shown in FIG. 1. The fiber tow 12 of narrow width is unwound from the spool 11 by a pair of nip rollers 14 through a guide 13. Both externally and internally (not shown) wound spools can be used in this invention. The fiber tow 12 is held at a constant level of tension between the nip rollers 14 and a second pair of nip rollers 18 mounted between the first pair of rollers 14 and the takeup drum 19. This arrangement ensures that the tow between 15 and 17 is held at the desired level of tension over the spreader 16 regardless of the level of tension of the tow 12 in the fiber spool 11. Alternatively the speed of the take-up drum 19 can be regulated to maintain a constant level of tension in the fiber tow as it passes over the spreader 16. The spreader 16 which consists of a speaker 16a powered by a frequency generator 16c and a power amplifier 16b spreads the incoming fiber tow into its individual filaments 17. The spreading tow zig-zags over and under a series of highly polished shafts or rods 16d. The spread tow at 17 then passes through the second pair of nip rollers 8 and is would on the take-up drum 19. Guide 20 can be used to maintain the spread of the fibers at 17; however, it is not necessary.

Spreader 16 is shown in more detail in FIG. 2. It consists of a speaker 16a mounted in a housing 16g and driven by the frequency generator 16b and the power amplifier 16c. The highly polished shafts 16d are mounted adjacent to the speaker 16a. The shafts 16d are held in place by means of an aluminum block 16e fitted with precision bearings 16f. The fiber tow of narrow width at 15 enters the spreader 16 and is spread to its individual filaments at 17. The function of the shafts 16d is to hold the spreading tow in its spread form 17 (due to friction) as it is being conveyed forward. The bearings 16f serve to reduce fiber damage by enabling the shafts 16d to move along with the fibers whenever there is excessive friction between the fibers and the shafts. Alternatively, the shafts can be driven by a motor so that they rotate synchronously with the same velocity as the fiber tow.

EXAMPLES

EXAMPLE 1

A set of 10 spreading runs were performed with a preferred version of the system. The material used was a carbon fiber tow (3000 fibers/tow, Hercules AS4 fibers, Hercules, Inc., Magna, Utah). The fiber tow 12 (width less than 5 mm) was unwound from a spool 11. It passed through a guide ring 3 and in between nip rollers 14 before entering the spreader 16. The spreader consisted on a 10" speaker 16a (8 ohm, 100 Watts) mounted in a plywood housing 16g. The speaker 16a was operated at different frequencies at an amplitude of 10.5–10.7 V by varying frequency generator 16c and a power amplifier 16b. The fiber tow 12 zig-zagged over and under the highly polished shafts 16e while being spread by the spreader 16 into its individual filaments at 17. The spread tow was then pulled in between nip rollers 18 and wound on a take-up drum. The speeds of the two nip rollers 14 and 18 were controlled by a computer and monitored 9.1 times every second. This maintained a constant level of fiber tension in the tow as it passed over the spreader. The speed of the take-up drum 19 was controlled manually to take up any slack in the tow between the nip rollers 18 and the take-up drum. The amplitude and frequency of the sound wave entering the speaker 16 were monitored by means of a multimeter (the voltages reported in Tables I and II are root-mean-square amplitudes i.e. $V_{rms}=0.707$ (Amplitude)) and a frequency counter respectively. The width of the spread tow at 17 was measured after the tow had passed over the last of the shafts 16d. The distance travelled by the fiber tow from the fiber spool 11 to the take-up drum 19 was 65 inches. The duration of each of the runs shown in Table I was 10 minutes. In Tables I and II, NR 14 and NR 18 refer to nip rollers 14 and 18 respectively. The values shown in parenthesis for motor speeds are the standard deviations of the instantaneous speeds of the nip rollers 14 and 18 measured during each run.

TABLE I

| | EFFECT OF FREQUENCY ON SPREADING WIDTH | | | | |
|---|---|---|---|---|---|
| | Frequency | Amplitude (rms) | Speed of nip rollers (cm/sec) | | Width |
| No. | (Hz) | (V) | NR(14) | NR(18) | (cm) |
| 1 | 21.1 | 10.5 | 3.00 (0.16) | 3.00 (0.10) | 0.5–4 |
| 2 | 25.3 | 10.7 | 3.00 (0.16) | 3.00 (0.08) | 3–7 |
| 3 | 30.0 | 10.5 | 3.00 (0.15) | 3.00 (0.11) | 4–9 |
| 4 | 32.1–32.4 | 10.5 | 3.00 (0.13) | 3.00 (0.09) | 5–9 |
| 5 | 34.3 | 10.5 | 3.00 (0.14) | 3.00 (0.09) | 5–9 |
| 6 | 36.1 | 10.6 | 3.00 (0.14) | 3.00 (0.09) | 6–9 |
| 7 | 38.3–38.4 | 10.5 | 3.00 (0.14) | 3.00 (0.09) | 5–9 |
| 8 | 40.0 | 10.5 | 3.00 (0.15) | 3.00 (0.10) | 4–7 |
| 9 | 42.2 | 10.5 | 3.00 (0.14) | 3.00 (0.09) | 2–6 |
| 10 | 44.1 | 10.5 | 3.00 (0.14) | 3.00 (0.09) | 0.5–5 |

Table I shows the effect of frequency of the sound wave on spreading width provided the amplitude is kept constant. The carbon fibers used in this example have an average diameter of 8 microns. Hence a width of 4.8 mm implies that the tow has been spread to expose individual filaments with an average spacing of one fiber diameter in between adjacent fibers. As can be seen, there is a narrow range of frequencies between 32 to 39 Hz at which the efficiency of spreading is the maximum i.e. the fibers absorb the most acoustic energy causing them to vibrate and the tow to spread to its individual filaments.

EXAMPLE 2

A set of 6 runs were performed with the same version of the process as in Example 1. Here the frequency of the sound wave was kept approximately constant at 36.0–36.4 Hz while the amplitude was varied from 4.7 to 11.8 V. The measured widths show that spreading at 17 improves with increasing amplitude to a maximum beyond which there is no further improvement with increase in amplitude. It can be seen above an amplitude of 9.8 V, there is no tangible improvement in the quality of spreading.

In both the examples, the variations in spreading width was caused primarily by instantaneous fluctuations in the level of fiber tension in the tow 15 as it passed over the spreader due to instantaneous variations in speed as evidenced by the standard deviations shown in Table II. At the optimum range of frequencies and amplitudes, the fibers in the tow absorb significant acoustic energy and are able to retain their spread shape in response to these fluctuations. Outside this range, the fibers tend to come back to a narrow width. Once this happens, the fibers take a longer time to spread depending on the deviation of the operating variables of the spreader 16 from their optimum values.

TABLE II

EFFECT OF AMPLITUDE ON SPREADING WIDTH

| No. | Frequency (Hz) | Amplitude (rms) (V) | Speed of nip rollers (cm/sec) NR(14) | Speed of nip rollers (cm/sec) NR(18) | Width (cm) |
|---|---|---|---|---|---|
| 1 | 36.3-36.4 | 4.7 | 3.00 (0.15) | 3.00 (0.09) | 0.5-4 |
| 2 | 36.3 | 7.6 | 3.00 (0.14) | 3.00 (0.09) | 4-7 |
| 3 | 36.3 | 9.8 | 3.00 (0.14) | 3.00 (0.09) | 6-9 |
| 4 | 36.3-36.4 | 10.1 | 3.00 (0.13) | 3.00 (0.08) | 7-9 |
| 5 | 36.1 | 10.6 | 3.00 (0.14) | 3.00 (0.09) | 6-9 |
| 6 | 36.0 | 11.8 | 3.00 (0.16) | 3.00 (0.09) | 7-9 |

The rods 16d can be mounted in a single plane; however, they can also be mounted outside of a single plane. All the rods 16d are required to do is to provide a zig-zag movement to the tow of fibers 15 so that the fibers are spread apart. Likewise the radius of curvature of the rod 16d is not important so long as the fiber is not damaged.

It is intended that the foregoing description be only illustrative of the present invention and that the present invention be limited only by the hereinafter appended claims.

We claim:

1. A method for spreading fibers of a tow of fibers which comprises:
   (a) providing a system for spreading fibers in a tow of the fibers which comprises: feed means for feeding the tow of the fibers; spreader means for spreading the tow of the fibers from the feed means including a vibrating means for a gaseous medium mounted in a housing adjacent to the tow of the fibers to spread the fibers and multiple rod means mounted adjacent to the vibrating means and spaced apart in the direction of movement of the tow of the fibers such that the tow of the fibers zig-zag over and under the rod means so that the fibers in the tow spread apart as the tow between the rod means, wherein the rod means each have a polished surface supporting the fibers which allow fibers to spread apart on the rod means as the fibers are acted upon by the vibrating means; and take-up means for the spread apart fibers in the tow after the tow has moved through the spreader means; and
   (b) feeding the tow of the fibers through the spreader means and between the feed means and the take-up means, wherein the vibrating means spreads the fibers on the rod means to provide the spread apart fibers in the tow on the take-up means.

2. The method of claim 1 wherein the vibrating means is a speaker means which produces a sound level of between about 80 and 130 dB.

3. The method of claim 1 wherein the feed means and take-up means maintain a constant tension of the tow of fibers above the vibrating means so that the fibers are uniformly spread apart as the tow moves through the spreader means.

4. The method of claim 1 wherein the rod means are mounted in a single plane in the direction of movement of the tow between the rod means in a holder mounted above the speaker means on the housing for the vibrating means.

5. The method of claim 4 wherein the rod means are cylindrical.

6. The method of claim 5 wherein the surface of the rod means is highly polished.

7. The method of claim 1 wherein the rods are rotatable.

* * * * *

UNITED STATES PATENT AND TRADEMARK OFFICE
CERTIFICATE OF CORRECTION

PATENT NO.   :   5,042,122
DATED        :   1991 August 27
INVENTOR(S)  :   Shridhar Iyer and Lawrence T. Drzal It is certified that error appears in the above—identified patent and that said Letters Patent is hereby corrected as shown below:

On the title page:

in the Abstract, line 5, "two" should be --tow--.

Column 3, line 31, "would" should be --wound--.

Column 6, line 7, after "tow", --moves-- should be --inserted--.

Signed and Sealed this

Sixteenth Day of February, 1993

*Attest:*

STEPHEN G. KUNIN

*Attesting Officer*    Acting Commissioner of Patents and Trademarks